United States Patent [19]

Brewis

[11] Patent Number: 5,607,257
[45] Date of Patent: Mar. 4, 1997

[54] DRILLING APPARATUS

[76] Inventor: Roderick C. Brewis, Handlemaker Road, Marston Trading Estate, Frome, Somerset. BA114RW, Great Britain

[21] Appl. No.: 370,321

[22] Filed: Jan. 10, 1995

[30] Foreign Application Priority Data

Jan. 11, 1994 [GB] United Kingdom ................... 9400362

[51] Int. Cl.⁶ ................. F16L 1/00; F16L 27/00; F16L 27/06
[52] U.S. Cl. ................. 405/184; 285/94; 285/276; 285/281
[58] Field of Search ............... 405/184; 175/19, 175/22, 61, 171; 285/94, 276, 281

[56] References Cited

U.S. PATENT DOCUMENTS

| | | | |
|---|---|---|---|
| 3,367,681 | 2/1968 | Braukman | 285/281 X |
| 3,799,589 | 3/1974 | Boelkins | 285/281 |
| 4,205,866 | 6/1980 | McCracken | 285/281 |
| 4,326,736 | 4/1982 | Kusumi et al. | 285/98 |
| 4,478,435 | 10/1984 | Cheshier et al. | 285/281 X |
| 4,687,365 | 8/1987 | Pomersberger | 403/2 |
| 4,693,500 | 9/1987 | Anderson | 285/276 X |
| 4,911,579 | 3/1990 | Lutz et al. | 405/184 |
| 5,176,211 | 1/1993 | Halderman et al. | 175/66 |

Primary Examiner—Stephen J. Novosad
Assistant Examiner—Tara L. Mayo
Attorney, Agent, or Firm—Larson and Taylor

[57] ABSTRACT

A swivel device for coupling a back reamer to a plastic pipe to be drawn through a hole has a swivel shaft that extends into a tubular body and engages a bearing. At one side of the bearing an O-ring seals between the shaft and the body. A grease supply path extends past the bearing to a grease chamber on the bearing side of the O-ring and thence via a duct, to a grease chamber on the other side of the O-ring.

13 Claims, 8 Drawing Sheets

Fig. 11

DRILLING APPARATUS

BACKGROUND OF THE INVENTION

The present invention relates to drilling apparatus, and, in particular, to apparatus for use in drilling underground, e.g. drilling under highways for the purpose of installing components such as cables, ducts and pipes.

It is known to use a process called "directional drilling" to install services in sensitive areas where open cut techniques cannot be used such as under runways, motorways, rivers and railways. A small diameter hole is first bored under the crossing using a boring head and drill string made up of steel tubes through which a bentonite slurry known as "Mud" is pumped at high pressure. The boring head is then replaced with a back reamer behind which is connected, via a swivel, the plastic pipe (or other component) to be installed. The drill string is then rotated and pulled back, whilst mud is again pumped through the rods and out of jets in the reamer. The rotating reamer enlarges the hole, whilst the mud cools it and stabilises the opening. The pipe is thus pulled back under the crossing. If, however, the swivel seizes up, the plastic pipe is wound up and irreparably damaged, and the crossing is abandoned, wasting costly time and materials.

A conventional swivel has a tubular body portion into which a swivel shaft extends, there being a bearing to facilitate relative rotation. There is a lip seal intended to exclude mud and other debris from the, bearing. Grease is normally pumped into the swivel before each shot, but because the seal is orientated to keep mud out rather than grease in, this tends to lift the lip of the seal off the swivel shaft and allow ingress of grit. The seal immediately starts to deteriorate and allows more debris to pass. When this reaches the bearing, the eventual destruction of the bearing, and hence the swivel, is inevitable. Common practice is to throw swivels away and replace them before they fail. Thus, an improved sealing arrangement is desirable.

The bearings are also subject to large forces. In order to make them better able to stand up to the forces, larger bearings may be used. But this requires larger housing spaces to be provided in the swivel devices, leading to many practical problems. It is also known to use two or more angular contact bearings, stacked one behind another along the swivel shaft, with a backing nut behind the last one. But this is not very effective.

SUMMARY OF THE INVENTION

In one aspect the invention provides a swivel device for use in drilling apparatus, said device comprising a tubular body portion; a swivel shaft which extends into the tubular body portion; a bearing assembly interposed between the shaft and the body portion to facilitate relative rotation; and a seal assembly for resisting ingress of mud into the space between the shaft and the body portion; said seal assembly comprising an O-ring surrounding the shaft, and means for supplying grease to both axial sides of the O-ring. Thus there may be a grease supply path leading to a first grease chamber at a first axial side of the O-ring; a second grease chamber at the second axial side; and a duct for communicating grease to the second chamber. There may be non-return means for resisting backflow of grease from the second chamber. There may be a second O-ring axially beyond the second chamber, and a third chamber axially beyond the second O-ring, with a duct for supplying grease, e.g. from the second chamber.

Preferably, the bearing assembly comprises a double taper (opposed) roller bearing. The swivel will therefore operate equally well in compression as in tension; e.g. if the drill string is "backed up".

In a second aspect the invention provides a swivel device for use in drilling apparatus, said device comprising a tubular body portion; a swivel shaft which extends into the tubular body portion; a bearing assembly interposed between the shaft and the body portion to facilitate relative rotation; and a seal assembly for resisting ingress of mud into the space between the shaft and the body portion; said bearing assembly comprising two thrust bearings mounted on the swivel shaft at axially spaced regions thereof, each thrust bearing being individually locked in place. Preferably, each of the thrust bearings is locked in place by means of a respective locking assembly mounted on the swivel shaft. A locking assembly may comprise a thrust nut and a locking nut or washer. When assembling the device the bearings can be individually pretensioned and locked up.

Preferred embodiments incorporate both the first and second aspect.

In a third aspect the invention provides drilling apparatus comprising a drill component such as a back reamer, and a swivel device connected thereto.

In a fourth aspect the invention provides a method of drilling.

Some embodiments of the invention will now be described in more detail with reference to the accompanying drawings.

BRIEF DESCRIPTION OF THE DRAWINGS

FIG. 11a is a blow-up of a portion of the invention shown in FIG. 11 identified by 11a.

DESCRIPTION OF THE PREFERRED EMBODIMENTS

Figure 1:
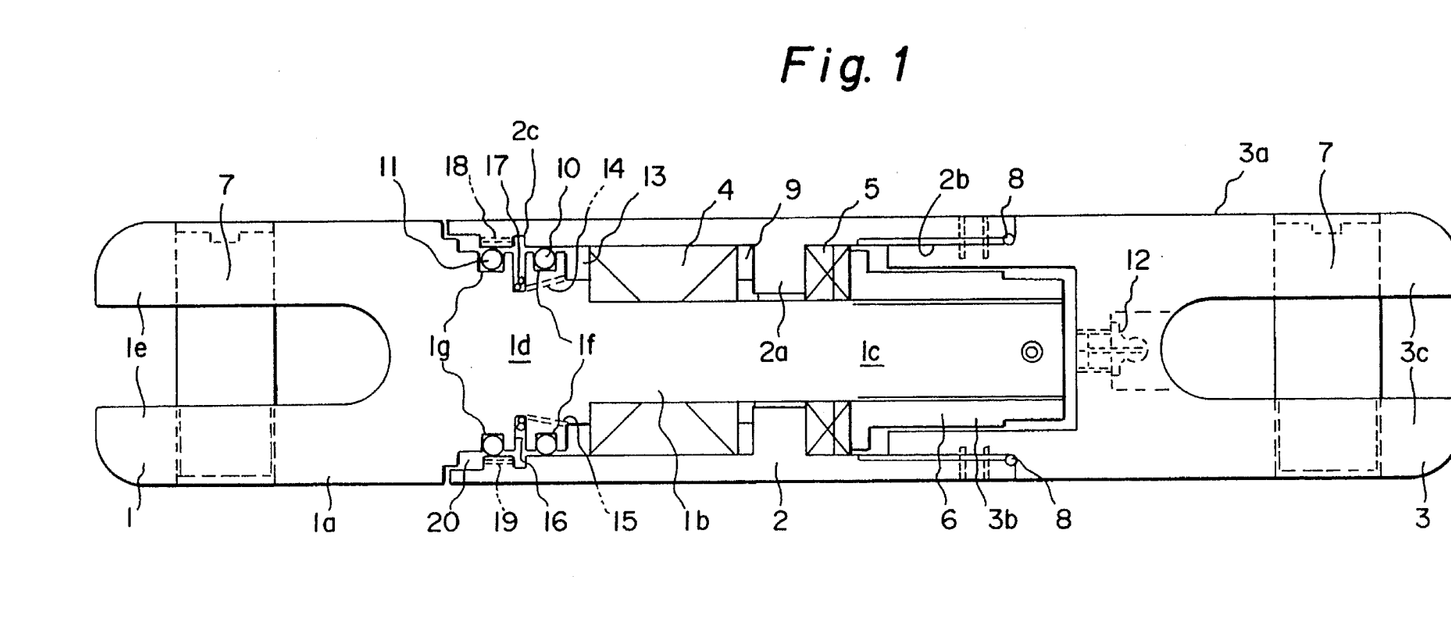
FIG. 1 is an axial section of a swivel device which is a first embodiment of the invention.

The swivel device shown in FIG. 1 has a swivel shaft 1, body 2, and a cap 3 all suitably made of high tensile steel, e.g. EN24T. The body 2 is tubular with an inwardly protruding flange 2a at an intermediate region. The inner portion of the body 2 has an internal thread 2b. The shaft 1 has an outer portion 1a of similar external diameter to the body 2, and a reduced portion 1b that extends through the body 2, projecting beyond its inner end. The reduced portion 1b is mainly a rod 1c of uniform diameter but, between this and the outer portion 1a, there is a seal zone 1d of more complex shape for providing, together with the body 2, a series of chambers and cavities, which will be described later. The inner end portion of the rod 1c is threaded.

The cap 3 has a main portion 3a of similar external diameter to the body 2, and a reduced shank portion 3b having an external thread engageable with the internal thread 2b of the body. An O-ring 8 provides a seal between the body and the cap adjacent the start of the cap's reduced portion 3b. The cap 3 is partially tubular, opening towards the body 2. The outer portion of the swivel shaft 1 and cap 3 (remote from the body 2) are similar, with spaced arms 1e, 3c, bridged by clevis pins 7 of hard material, e.g. heat-treated high tensile steel. The cap has an axial passage extending from the outer region between the arms 3c to the tubular interior. This houses a grease nipple 12.

A sealed-for-life double taper roller bearing 4 is an annular unit located within the body 2, slightly spaced from the flange 2a by a radial bearing chamber 9. It embraces the rod 1c and abuts a step at the start of the seal zone 1d. On the other side of the flange 2a, the rod 1c is embraced by a thrust bearing 5. A thrust nut 6 is screwed onto the threaded end of the rod to hold the bearing 5 against the flange 2a.

Figure 2:
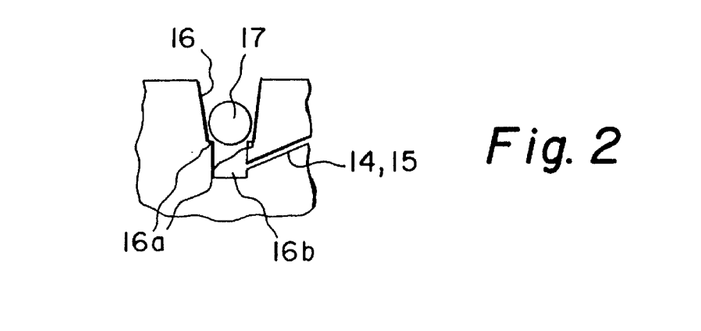
FIG. 2 is a detail of part of the seal assembly of the first embodiment.

In the seal zone 1d, starting from the rod 1c, there is a first radial step defining a first chamber 13 followed by a main portion whose diameter is only slightly less than the internal diameter of the body but having a first annular recess 1f housing a first shaft seal O-ring 10, a second annular recess 1g similar to the first and housing a second shaft seal O-ring 11 and, intermediate these recesses, a deeper and narrower intermediate recess defining a second chamber 16 which also extends radially outwardly into a recess 2c in the body. Beyond the second annular recess 1g there is a third chamber 20, in this case produced by thinning of the body 2. A pair of ducts 14, 15 communicate the first chamber with a radially inner region of the second chamber 16. A second pair of and 19 which extend within the thickness of the body 2 communicate a radially outer region of the second chamber with the third chamber. A detail of the lower region of the second chamber 16 is shown in FIG. 2. The lower region narrows downwardly to opposed steps 16a leading to a narrow innermost region 16b into which the first ducts 14,15 open. An O-ring 17 is located as shown, the surfaces of the steps providing a sealing surface. The resilience of the ring 17 pulls it into sealing engagement, but it is displaceable outwardly by pressure from the innermost region 16b.

In use, the swivel 1 is supported by the radial bearing 4 in the body 2. The thrust is taken by the thrust bearing 5 and the thrust nut 6. The cap 3 is sealed to the body 2 by means of the 'O' ring 8. Silicone grease, highly resistant to wash-out, is pumped into the assembly via the grease nipple 12.

The flow is from right to left and the grease progressively fills the thrust bearing chamber. It is then forced through into the radial bearing chamber 9, past the bearing into the first chamber 13. (NB the bearing 4 is sealed-for-life.)

The grease then flows through the first two fine ducts 14,15 into the second chamber 16. The 'O' ring 17 in the second chamber 16 seals on the tapering sides of chamber 16 forming a non return valve. Grease forced through the first pair of ducts 15,16 lifts the 'O' ring off its seat, the grease passes, then the 'O' ring contracts onto its seal and seals, thus preventing return of possibly contaminated grease.

The grease is bled through the second pair of fine ducts 18,19 into the third chamber 20, and hence to atmosphere.

As mud tries to penetrate, it is resisted initially by the grease packed into the third chamber 20. Its further penetration is prevented by 'O' rings 11,10. The 'O' rings are lubricated and extra protection from mud is provided by the grease chambers 16 and 13. In the unlikely event that mud passes through the second ducts 18,19 it is prevented from passing onwards through the first ducts 14,15 by the non-return valve formed by the O-ring 17 in the second chamber 16.

Any ingress of mud can be flushed out by pumping in fresh grease before each use and the bearings will be protected indefinitely.

Figure 3:
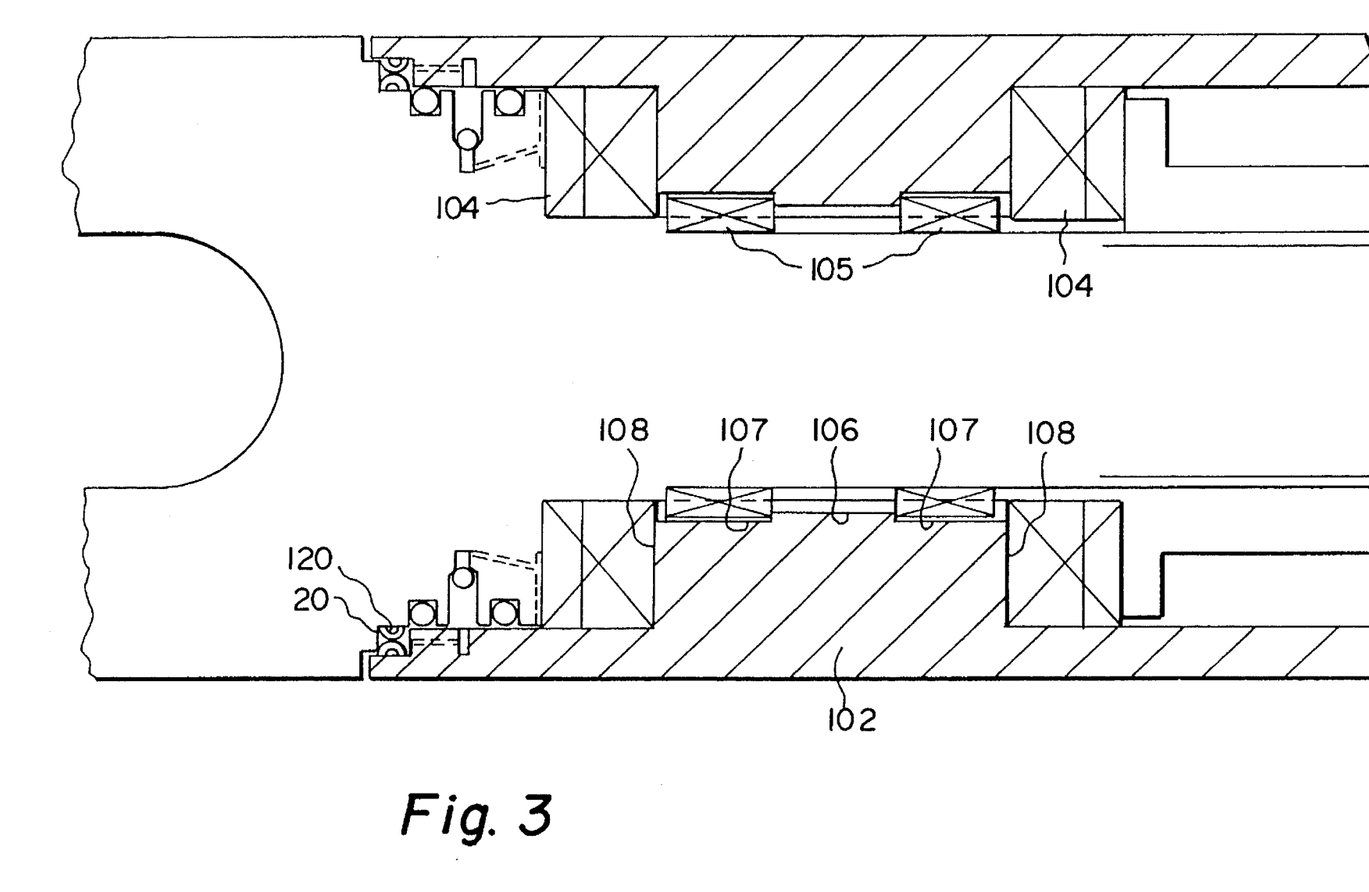
FIGS. 3 and 4 are axial sections through second and third embodiments.
Figure 4:
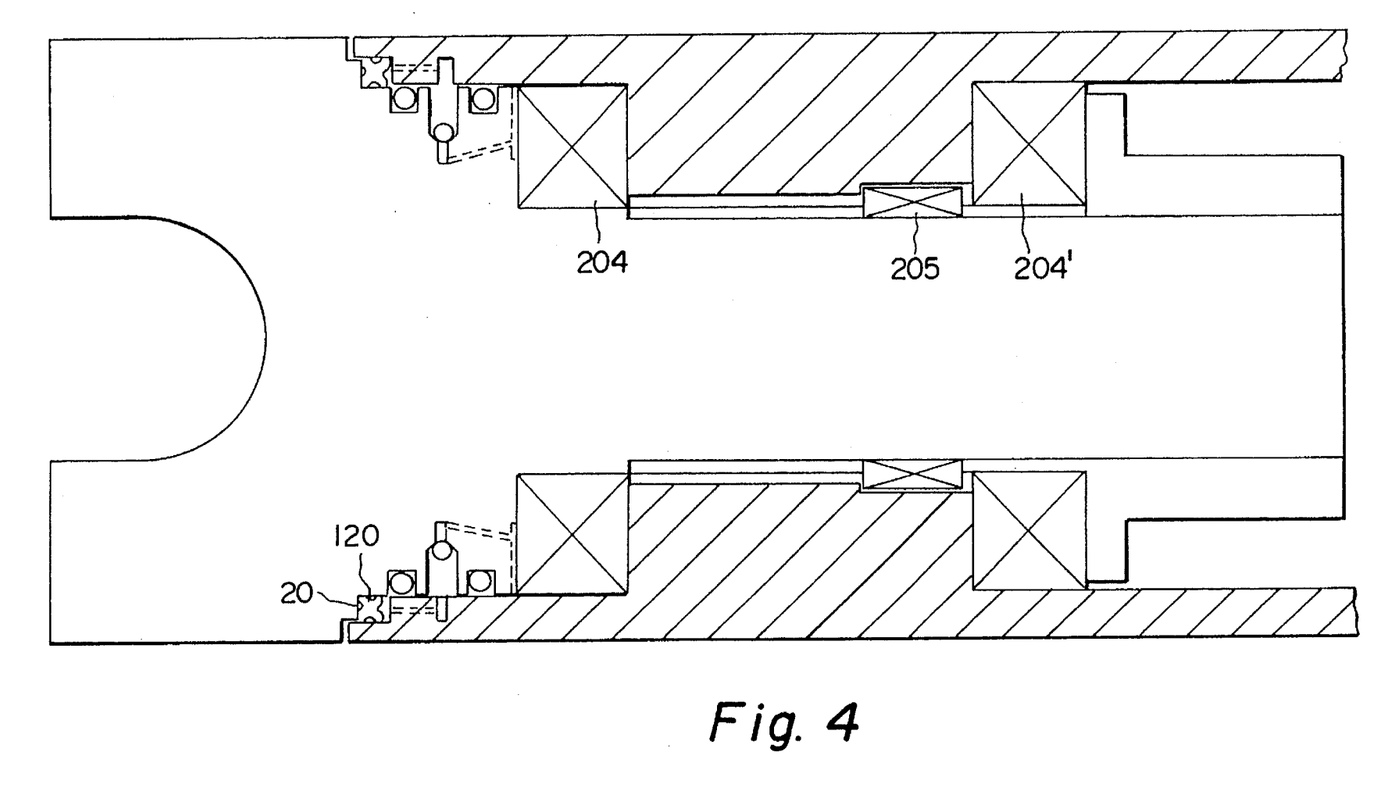
Figure 5:
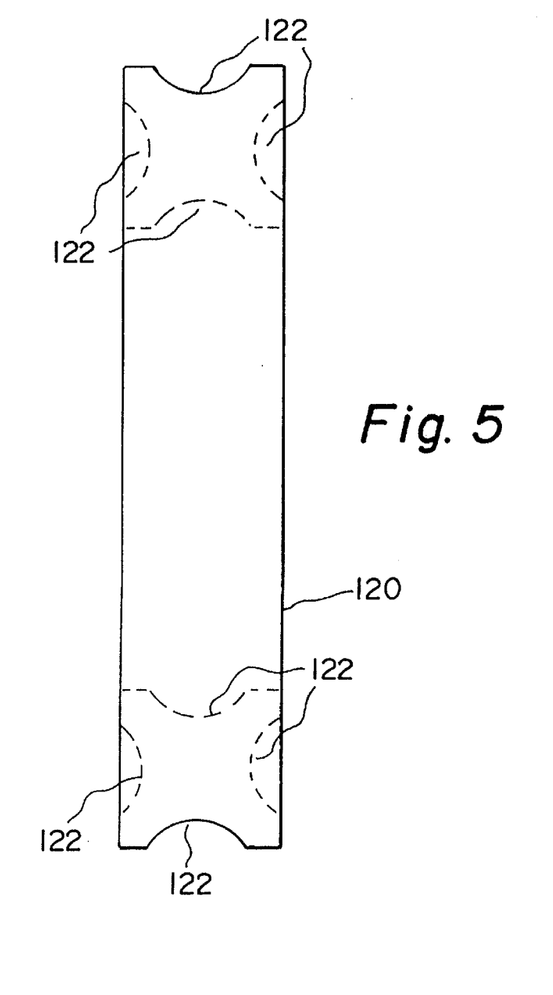
FIGS. 5 and 6 are end elevations of sealing rings.
Figure 6:
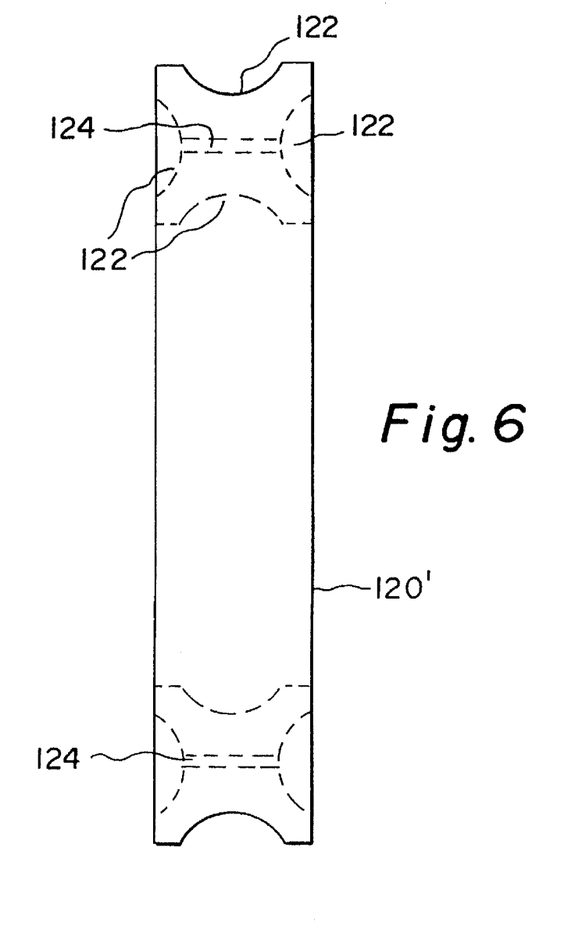

FIGS. 3 and 4 show further embodiments, differing in some details from the first embodiment. Thus the third chamber 20 contains a sealing ring 120. (This could also be provided in the first embodiment.) This preferably has a "quadrate" cross-section which is basically square with concavities on the faces. Such rings are commercially available e.g. under the names NU-LIP (from Pioneer) and QUAD. Examples of such rings are shown in FIGS. 5 and 6. FIG. 5 shows a ring 120 whose cross-section is a square with arcuate recesses 122 in each face. FIG. 6 shows a ring 120' that differs from that of FIG. 5 in having fine paraxial ducts 124 extending between the middle of axially opposite faces. There may be four such ducts, at 90° intervals.

A ring (120 or 120') in the third chamber 20 helps to retain grease in the chamber and prevent it from bleeding to atmosphere too readily. It seals on the opposed radially inner and outer walls of the chamber. A ring 120' with fine ducts 124 facilitates the escape of air as the device is charged with grease.

FIGS. 3 and 4 also show alternative bearing arrangements. Instead of the sealed-for-life double taper roller bearing 4 of the first embodiment, FIG. 3 shows an axially spaced pair of roller thrust bearings 104 and, between them, a pair of needle roller bearings 105. The inner wall of the tubular body 102 is shaped to accommodate them. Thus there is a portion 106 of reduced diameter with a recess 107 at each end- for accommodating the needle roller bearings 105. From the outer ends of the recesses there are steps 108 against which the roller thrust bearings 104 abut.

FIG. 4 shows a similar arrangement but using one taper roller bearing 204 and one spherical taper roller bearing 204' instead of the pair of roller thrust bearings. There may be only a single needle roller bearing 205, adjacent the spherical taper roller bearing 204'.

Figure 7:
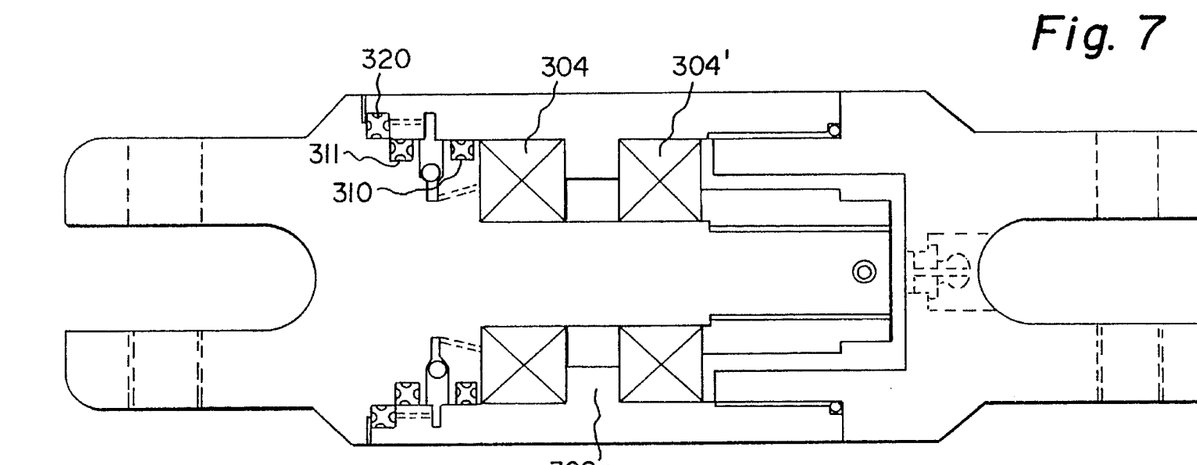
FIGS. 7–9 are axial sections of further embodiments.

FIG. 7 shows another embodiment, in which the bearings are two taper roller bearings 304, 304' arranged in opposition either side of the body flange 302a. The tapers are at steep angles to the axis. As in the FIG. 3 embodiment, there are three O-rings 310, 311, 320 sealing between the swivel shaft and the tubular body. In this example all are of "quadrate" section.

Figure 8:
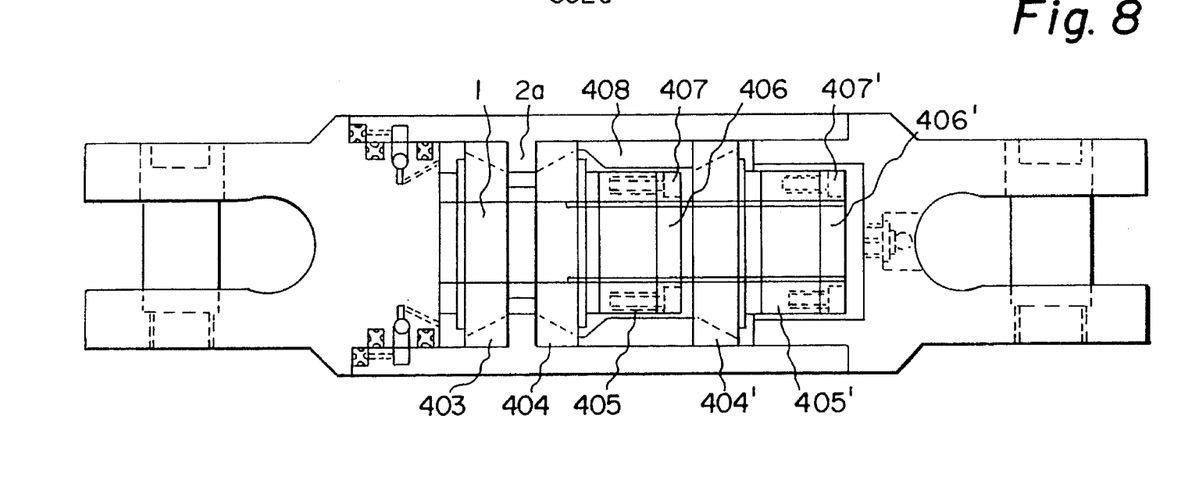

FIG. 8 shows another embodiment using three taper roller bearings 403,404 and 404', and two thrust nuts 405 and 405'. On assembly the inner thrust nut 405 is adjusted to bear on the inner thrust bearing 404 and locked to the shaft 1 by means of a threaded lock washer 406 and cap head screws 407 (6 in number in this example). (When separated by a quarter turn, the combination of the nut and threaded washer 406 clamp on the thread like a conventional split nut.) A spacer 408 is then introduced into the body and bears on the cup of the inner bearing 404. The outer thrust bearing 404' is then secured in place by adjusting the thrust nut 405' hard against it and locking it using a threaded washer 406' and a further set (here 6) of cap head screws 407'.

In this configuration the load on the swivel is shared equally on the two thrust bearings 404 and 404' thus increasing the life of each by a factor of up to 10. The load on the outer thrust bearing 404' is transmitted via the spacer 408 to the cup of bearing 404 and thence to the flange in the body 2a. In the event of one thrust bearing failing the second thrust bearing will prevent seizure of the swivel and allow satisfactory completion of the drilling operation when the bearings can be replaced.

Figure 9:
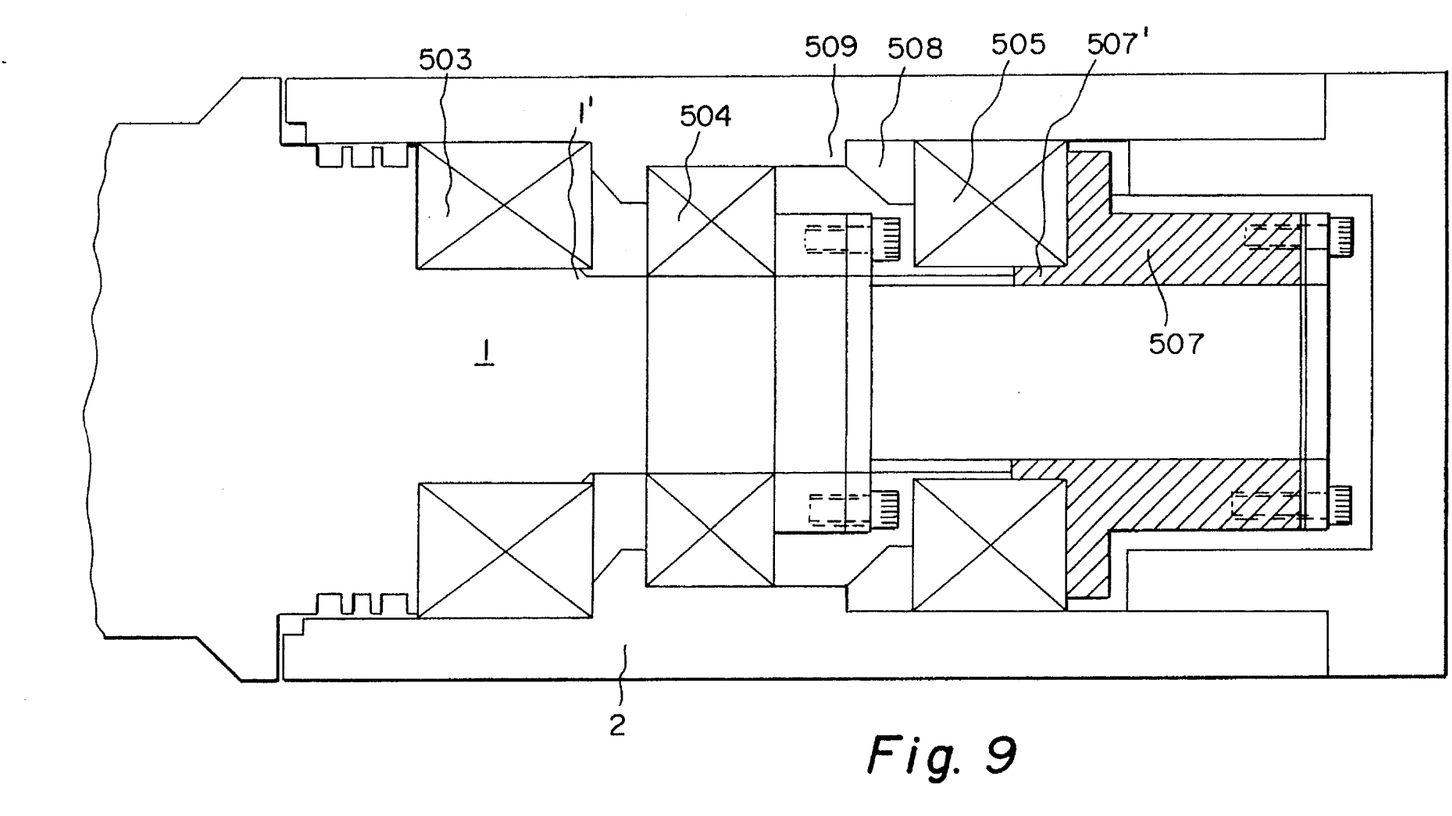
Figure 10:
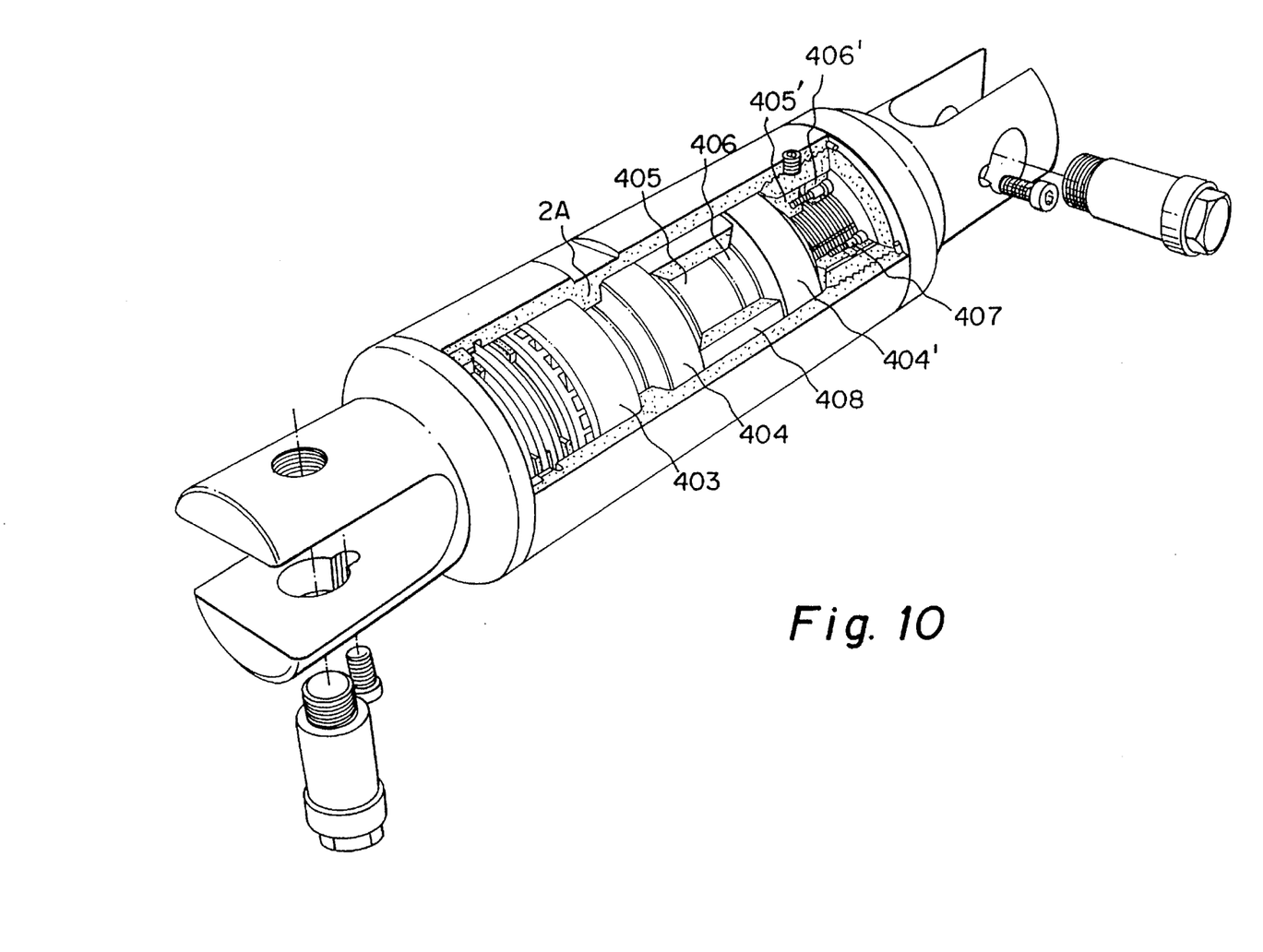
FIG. 10 is a perspective view of the embodiment shown in FIG. 8, partially cut away.
Figure 11:
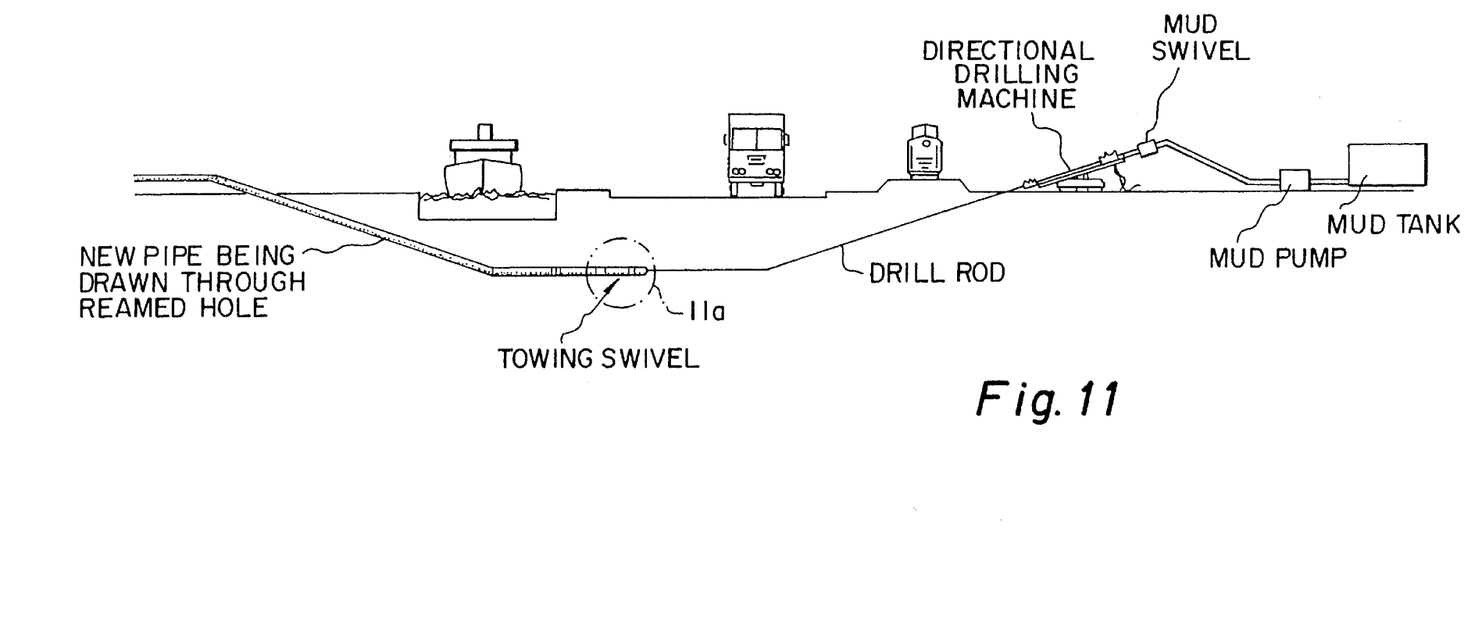
FIG. 11 is a schematic view of the invention in use.
Figure 11A:
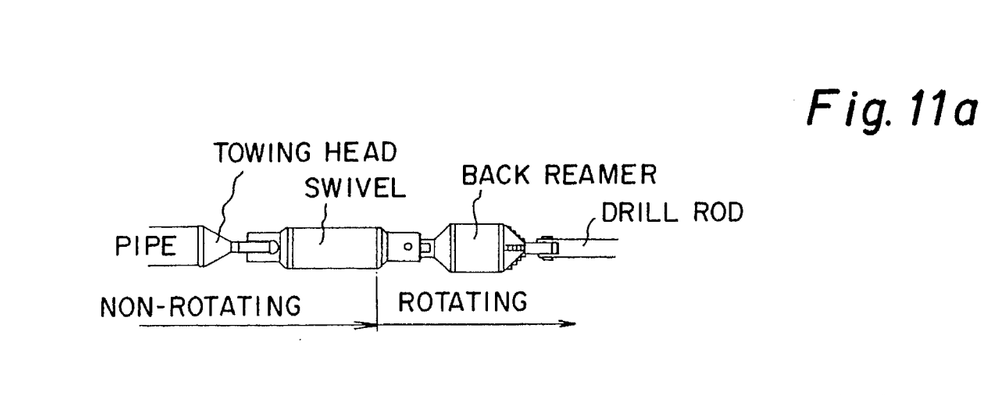

FIG. 9 shows a configuration of bearings suitable for larger sizes of swivels utilizing two taper roller bearings 503, 504 and one spherical taper roller bearing 505. In this variation the shaft 1 has a step 1' to accommodate the smaller bore size of the bearing 504, and the thrust nut 507 has a tubular portion 507' extending axially into the bearing to accommodate its larger bore size and thereby centralise the bearing and support the shaft.

The spacer 508 is supported by a step 509 in the body 2. Thus the load taken by the bearing 505 is transmitted via the spacer directly to the body, not via the cup of bearing 504. As in the previous embodiment (FIG. 8) the thrust nuts are again locked to the shaft using threaded washers and cap head screws.

The load on the swivel is again shared between the two bearings 504 and 505.

While the invention has been described and exemplified with reference to particular examples, it will be appreciated that modification and variation is possible within the spirit and scope of the invention. It is intended to include all such modifications and variations within the scope of the appended claims.

I claim:

1. A swivel device for use in drilling apparatus, said device comprising a tubular body portion; a swivel shaft which extends into the tubular body portion; a bearing assembly interposed between the shaft and the body portion to facilitate relative rotation; and a seal assembly for resisting ingress of mud into the space between the shaft and the body portion; said seal assembly comprising an O-ring surrounding the shaft, and means for supplying grease to both axial sides of the O-ring, said grease supplying means comprising a grease supply path leading to a first axial (upstream) side of the O-ring; a downstream grease chamber at the second axial (downstream) side of the O-ring, and a duct for communicating grease from the upstream side of the O-ring to the downstream grease chamber.

2. A swivel device according to claim 1 wherein said duct is provided by a passageway extending axially within the swivel shaft.

3. A swivel device according to claim 1 wherein there is an upstream grease chamber, at the upstream side of the O-ring, said grease supply path leading into said upstream grease chamber and said duct leading out of said upstream grease chamber.

4. A swivel device according to claim 1 having non-return means associated with said duct for resisting reverse flow from the downstream grease chamber.

5. A swivel device according to claim 1 having a second O-ring downstream of the downstream grease chamber, a second downstream chamber downstream of the second O-ring, and a second duct for supplying grease to the second downstream chamber.

6. A swivel device according to claim 5 wherein said second duct is provided by a passageway extending axially within the wall of the tubular body portion.

7. A swivel device according to claim 5 wherein said second downstream chamber contains an O-ring.

8. A swivel device according to claim 1 wherein at least one said O-ring is an O-ring whose cross-section is a rectangle with concavities on its faces.

9. A swivel device according to claim 8 wherein at least one said O-ring has fine ducts extending between opposed axial faces.

10. A swivel device according to claim 1 further including a cap coupled to the tubular body at the upstream side thereof to close off said tubular body.

11. A swivel device according to claim 10 wherein said cap has a grease nipple, and said grease supply path extends through said nipple into the tubular body portion.

12. A towing swivel device for connection between a rotatable back reamer and a pipe to be pulled through a hole, said device comprising:

a tubular body portion having an inwardly protruding flange, said flange having both an inner and outer side;

a swivel shaft which extends into the tubular body portion;

a bearing assembly interposed between the shaft and the body portion to facilitate relative rotation; and a seal assembly for resisting ingress of mud into the space between the shaft and the body portion; said bearing assembly comprising a reverse thrust bearing adjacent said flange on the inner side thereof;

an inner thrust bearing adjacent said flange on the outer side thereof, said inner thrust bearing having an outer side;

a first thrust nut which engages said inner thrust bearing on the outer side thereof;

an outer thrust bearing axially spaced outwardly of said inner thrust bearing, said outer thrust bearing having an outer side; and a second thrust nut which engages said outer thrust bearing on the outer side thereof;

said reverse thrust bearing, said inner, and said outer thrust bearings being mounted on the swivel shaft;

each of said inner and outer thrust bearings being individually locked in place by a respective one of said first and second thrust nuts.

13. A swivel device according to claim 12 wherein said seal assembly comprises an O-ring surrounding the shaft, and means for supplying grease to both axial sides of the O-ring, said grease supplying means comprising a grease supply path leading to a first axial (upstream) side of the O-ring; a downstream grease chamber at the second axial (downstream) side of the O-ring, and a duct for communicating grease from the upstream side of the O-ring to the downstream grease chamber.

* * * * *